(12) United States Patent
Yi (10) Patent No.: US 8,090,262 B2
(45) Date of Patent: Jan. 3, 2012

(54) SERVICE HANDOVER METHOD, OPTICAL NETWORK SYSTEM, HANDOVER EQUIPMENT AND PE EQUIPMENT IN AN OVPN

(75) Inventor: Qiliang Yi, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 607 days.

(21) Appl. No.: 12/262,487

(22) Filed: Oct. 31, 2008

(65) Prior Publication Data

US 2009/0060502 A1 Mar. 5, 2009

Related U.S. Application Data

(63) Continuation of application No. PCT/CN2007/000281, filed on Jan. 25, 2007.

(30) Foreign Application Priority Data

May 16, 2006 (CN) .......................... 2006 1 0080827

(51) Int. Cl.
*H04J 14/08* (2006.01)
(52) U.S. Cl. ........................... 398/100; 398/99; 398/101
(58) Field of Classification Search .................... 398/45, 398/49–52, 54–58, 99–101
See application file for complete search history.

(56) References Cited

U.S. PATENT DOCUMENTS

| | | |
|---|---|---|
| 2002/0018468 A1 | 2/2002 | Nishihara |
| 2002/0021472 A1 | 2/2002 | Nakaishi |
| 2003/0147402 A1 | 8/2003 | Brahim |
| 2003/0193937 A1* | 10/2003 | Beshai et al. ................. 370/372 |
| 2003/0227915 A1* | 12/2003 | Brahim ......................... 370/389 |
| 2004/0151500 A1* | 8/2004 | Misawa et al. .................. 398/58 |

FOREIGN PATENT DOCUMENTS

| | | |
|---|---|---|
| CN | 1338832 A | 3/2002 |
| CN | 1338837 A | 3/2002 |
| CN | 1503577 A | 6/2004 |
| CN | 1520097 A | 8/2004 |
| CN | 1728648 A | 2/2006 |
| CN | 100558070 C | 11/2009 |
| EP | 1 206 060 A1 | 5/2002 |

(Continued)

OTHER PUBLICATIONS

Brahim, "Optical VPNs" PowerPoint Presentation (2001) http://www.nortelnetworks.com/products/library/collateral/,[;s2001_vpn_tutorial-part4.pdf [retrieved on Aug. 25, 2003].

(Continued)

*Primary Examiner* — Dzung Tran
(74) *Attorney, Agent, or Firm* — Leydig, Voit & Mayer, Ltd.

(57) ABSTRACT

An optical network system disclosed in an embodiment of the present invention contains a PE and a handover equipment located between the PE and a CE. The PE is adapted to provide optical network access for the CE. The handover equipment is adapted to disconnect a CE that finishes working at a handover time, and/or connect a PE with a CE that will work in a next time segment. The present invention also discloses a service handover method of optical networks. Furthermore, the present invention discloses a handover equipment and a PE in an optical network. The present invention can reduce the ports occupied by the PE.

8 Claims, 6 Drawing Sheets

FOREIGN PATENT DOCUMENTS

| | | |
|---|---|---|
| EP | 1 333 630 A2 | 8/2003 |
| GB | 2 346 280 A | 8/2000 |
| JP | 2004-179769 A | 6/2004 |

OTHER PUBLICATIONS

International Search Report in corresponding PCT Application No. PCT/CN2007/000281 (May 17, 2007).

Written Opinion of the International Searching Authority in corresponding PCT Application No. PCT/CN2007/000281 (May 17, 2007).

1st Office Action in corresponding European Application No. 07702199.6 (Apr. 23, 2009).

Brahim et al., "Service Requirements for Optical Virtual Private Networks," Internet Draft, Nov. 2001, The Internet Society, Reston, Virginia.

Lei et al., "Research on Technology of Optical Virtual Private Network," Mar. 2004, Department of Optical Information Technology, Nanjing University of Posts and Telecommunications, Nanjing, China.

"Research of Using Optical Burst Switch Techniques to Build the Dynamic Optical Virtual Private Network," Optical Communication, Dec. 2003, World Telecommunications, International Telecommunication Union, Geneva, Switzerland.

\* cited by examiner

SERVICE HANDOVER METHOD, OPTICAL NETWORK SYSTEM, HANDOVER EQUIPMENT AND PE EQUIPMENT IN AN OVPN

CROSS-REFERENCE TO RELATED APPLICATIONS

This application is a continuation of International Patent Application No. PCT/CN2007/000281, filed Jan. 25, 2007, which claims priority to Chinese Patent Application No. 200610080827.3, filed May 16, 2006, both of which are hereby incorporated by reference in their entirety.

FIELD OF THE INVENTION

The present invention relates to optical network technologies, and in particular, to a service handover method, an optical network system, a handover equipment, and a Provider Edge (PE) equipment in an Optical Virtual Private Network (OVPN).

BACKGROUND

An OVPN is a new service application that emerges while the optical network transforms to an Automatically Switched Optical Network (ASON). It is a dynamically creatable network that operates across multiple managerial wavelengths, and provides the user with Virtual Private Network (VPN) services on the transport layer. Generally, such an OVPN is called a VPN (L1 VPN).

The OVPN enables the operator to divide an optical network into multiple sections available to multiple terminal users, and provide the comprehensive and secure capabilities of viewing and managing the user's own OVPN as if each user owns his own optical network. Therefore, users can build their own network topology in the public network flexibly at lower communication costs. With an OVPN, the operator can optimize the bandwidth utilization ratio, and provide more flexible and versatile wavelength services different from the usual monotone bandwidth service. The OVPN posses the merits of cost-efficiency, flexibility, reliability, security, and expansibility. Therefore, the OVPN services become the most promising value-added services (VASs) in an intelligent optical network, and provide new profit growth points on the existing networks for the operators.

Figure 1:
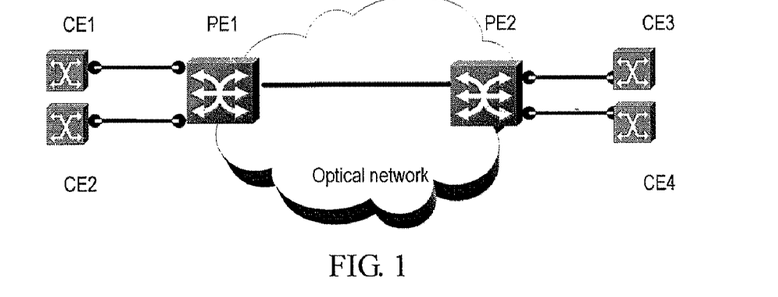
FIG. 1 shows the structure of a conventional OVPN.

FIG. 1 shows the structure of an OVPN. As shown in FIG. 1, an OVPN contains a Provider Edge (PE) equipment connected with the Customer Edge (CE) equipment. In the L1VPN, the PE is generally an optical network equipment, such as Optical Cross-Connect (OXC) equipment, and the CE is generally a client-side equipment, such as a router or a switch. Multiple PEs communicate with each other through an optical network to implement interworking between CEs.

In the example shown in FIG. 1, CE1 and CE2 are connected to PE1, CE3 and CE4 are connected to PE2, and PE1 is connected to PE2. Communication is required between CE1 and CE3 in the working time segment of 4:00~24:00 (T1); communication is required between CE2 and CE4 in the time segment of 00:00~4:00 (T2) at dawn. T2 is generally used for backing up data, and the bandwidth occupied by T1 is the same as that occupied by T2. In this way, PE1 must provide two ports connected with CE1 and CE2, respectively; PE2 must also provide two ports connected with CE3 and CE4, respectively. The bandwidth is multiplexed with respect to time in an OVPN. In order to implement service handover, the operator releases the bandwidth by releasing the path between CE2 and CE4 in the time segment T1, and uses the released bandwidth to create a path between CE1 and CE3. Likewise, in the time segment T2, the operator releases the bandwidth by releasing the path between CE1 and CE3, and creates a path between CE2 and CE4.

In the previous OVPN system, the port connected with the CE on the PE may be an optical interface of the Wavelength Division Multiplexing (WDM) equipment or an optical interface of the data board of the Synchronous Digital Hierarchy (SDH) equipment, and is costly. Since each PE occupies many ports, the networking costs of the OVPN are high. Moreover, for optical network equipment, if the services of different CEs do not change in the network of the operator in the working time segment after handover compared with those in the working time segment before handover, the operator must adjust the network route due to service handover although the communication bandwidth and path do not change within the time segments T1 and T2. In the process of adjusting the route, the reconfiguration of cross-connections leads to intermittency of services, thus affecting the Quality of Service (QoS) of the network.

SUMMARY

The present invention provides an optical network system in order to reduce the ports occupied by the PE. An optical network system according to an embodiment of the present invention includes: a Provider Edge, PE, adapted to provide optical network access for a Customer Edge, CE; and a handover equipment between the PE and the CE, adapted to disconnect a CE that finishes working at a handover time, and/or connect a PE with a CE that will work in a next time segment.

Further, the present invention provides a service handover method in an optical network in order to reduce the ports occupied by the PE. In the embodiments of the present invention, a handover equipment is preset between a Provider Edge, PE, and a Customer Edge, CE, and CE information in mutually complementing services and corresponding working time segments are pre-stored. The method includes: A. determining a handover time according to the stored working time segments; and B. disconnecting, upon arrival of the handover time, by the handover equipment, a CE that finishes working according to the stored CE information and the corresponding working time segments; and/or connecting a CE that needs to communicate in a next working time segment with a corresponding PE.

Further, a handover equipment in an optical network provided in an embodiment of the present invention is located between a Provider Edge, PE, and a Customer Edge, CE, and is adapted to disconnect a CE that finishes working at handover time and/or connect a PE with a CE that will work in a next time segment.

Further, a PE provided in an embodiment of the present invention is connected with handover equipment, and is adapted to connect or disconnect the handover equipment with a Customer Edge, CE at the handover time.

The previous technical solution reduces the ports occupied by the PE. Specifically, in the present invention, upon arrival of the handover time, the Network Management System (NMS) can control the handover equipment to disconnect the CE that finishes working and connect the CE that needs to communicate in the next working time segment with the corresponding PE. Alternatively, the PE corresponding to the handover time controls an optical switch through signaling or by other means to disconnect the CE that finishes working and/or connect the CE that needs to communicate in the next time segment. In this way, it is not necessary to configure a port for each CE at the PE side, thus reducing the ports connected with the CE on the PE and decreasing the networking cost of an optical network.

BRIEF DESCRIPTION OF THE DRAWINGS

The accompanying drawings are intended for better understanding of the present invention and constitute part of this application rather than limiting the present invention.

DETAILED DESCRIPTION

In order to make the technical solution, objectives and merits of the present invention clearer, the present invention is hereinafter described in detail with reference to accompanying drawings and preferred embodiments. The exemplary embodiments and description thereof are intended for interpreting rather than limiting the present invention.

An optical network system provided in an embodiment of the present invention is located between an optical network equipment and a client-side equipment, and includes a handover equipment.

Figure 2:
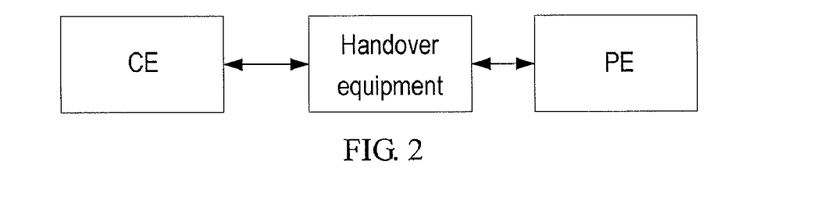
FIG. 2 shows an exemplary structure of an OVPN system, according to an embodiment of the present invention.
Figure 3:
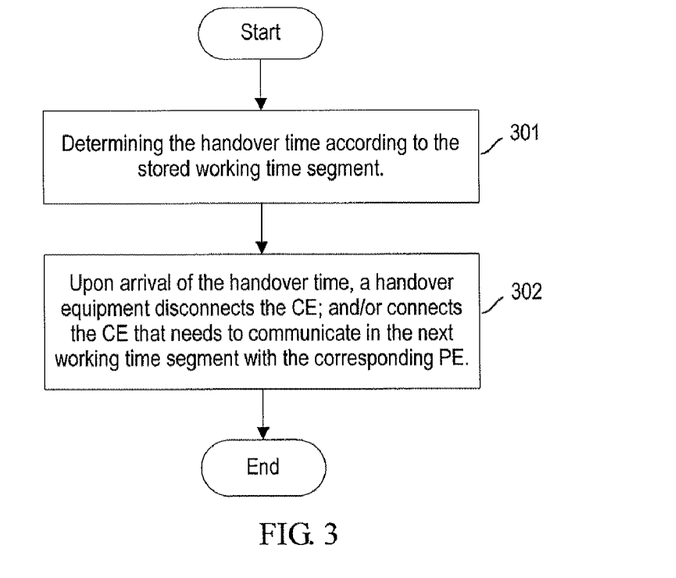
FIG. 3 is an exemplary flowchart of the service handover method in an OVPN, according to an embodiment of the present invention.

FIG. 2 shows an exemplary structure of an OVPN system that serves as an optical network system in an embodiment of the present invention. As shown in FIG. 3, the OVPN includes: a PE, and a handover equipment located between the PE and the CE. The PE is adapted to provide OVPN network access for the CE; the handover equipment is adapted to disconnect the CE that finishes working at the handover time, and/or connect the PE with the CE that will need the OVPN service in the next time segment.

Therefore, the handover equipment provided by the present invention is located between the PE and the CE, and is adapted to disconnect the CE that finishes working at the handover time, and/or connect the PE with the CE that will work in the next time segment.

A PE provided in an embodiment of the present invention is connected with the handover equipment, and is adapted to connect or disconnect the handover equipment with the CE at the handover time.

In the actual application, the handover equipment provided by the present invention may be an optical switch or a fiber cross-connect matrix.

With the previous OVPN network, when the handover time arrives in the OVPN service handover process according to the present invention, the handover equipment disconnects the CE that finishes working, and/or connects the PE with the CE that will need the OVPN service in the next time segment.

FIG. 3 is an exemplary flowchart of the service handover method in an OVPN, according to an embodiment of the present invention. As shown in FIG. 3, an embodiment of the present invention pre-stores the CE in the mutually complementing services and the corresponding working time segment. The method includes the steps as described hereinafter.

Step 301: determining the handover time according to the stored working time segment; and Step 302: disconnecting, upon arrival of the handover time, by a handover equipment, the CE that finishes working according to the stored CE and the corresponding working time segment; and/or connecting the CE that needs the OVPN service in the next working time segment with the corresponding PE.

For an OVPN, the mutually complementing services are generally the services that do not overlap with each other in the working time segment. At the beginning of constructing the OVPN network, the present invention analyzes the working time segment of each service, and binds multiple services that comply with the definition of mutually complementing services into mutually complementing services.

The handover operation of the handover equipment according to the present invention can be performed under the control of a Virtual Private Network (VPN) manager, or performed under the control of a PE. The following four embodiments are intended to describe the OVPN service handover method and the OVPN system under the present invention.

Embodiment 1 according to the present invention is elaborated below.

Figure 4:
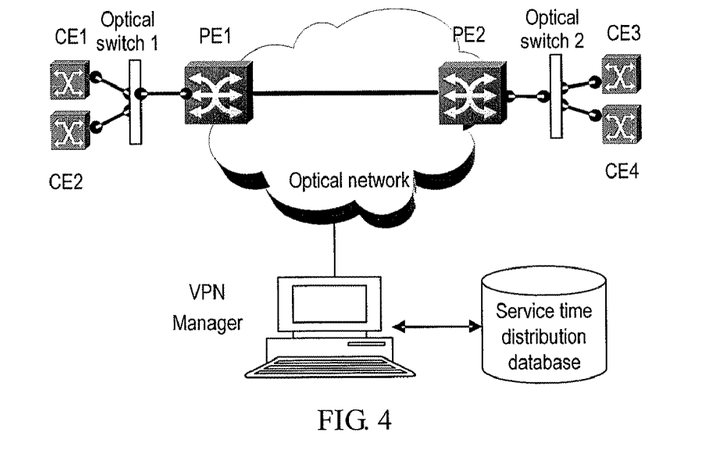
FIG. 4 shows the structure of an OVPN system, according to a first embodiment of the present invention.

FIG. 4 shows a structure of an OVPN system in this embodiment, supposing that the OVPN system includes two optical switches. As shown in FIG. 4, the OVPN system provided by the present invention contains a VPN manager and a service time distribution database in addition to a PE and an optical switch that serves as a handover equipment, wherein:

the service time distribution database is adapted to save the CE information in the mutually complementing service and the corresponding working time segment; and the VPN manager is adapted to read data from the service time distribution database, determine the handover time according to the read data, notify the optical switch corresponding to the CE that finishes working to disconnect the CE upon arrival of the handover time, and/or notify the information on the CE that needs to be connected in the next working time segment to the optical switch corresponding to the CE, so that the optical switch will connect the CE with the PE.

The service time distribution database in this embodiment may be independent of the VPN manager, or located inside the VPN manager.

Figure 5:
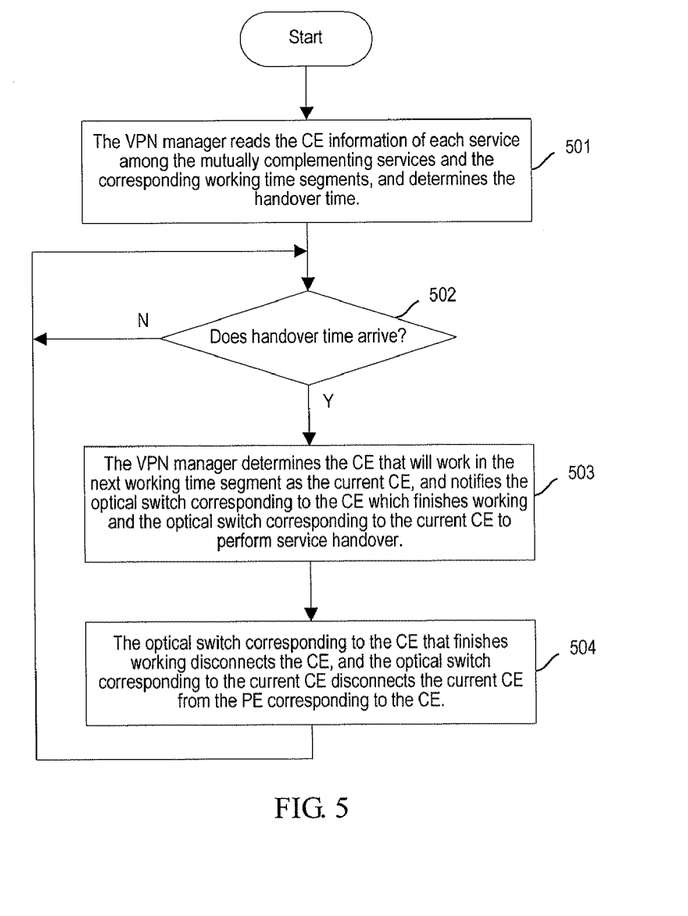
FIG. 5 is a flowchart of the service handover method in an OVPN, according to the first embodiment of the present invention.

FIG. 5 is a flowchart of the service handover method in an OVPN according to an embodiment of the present invention. This embodiment pre-stores the CE information of the mutually complementing services and the corresponding working time segment in the service time distribution database. For example, the working time segment T1 of the service between CE1 and CE3 in FIG. 4 is 4:00~24:00; and the working time segment T2 of the service between CE2 and CE4 is 0:00~4:

00. Therefore, the CE information of each service and the corresponding working time segments can be recorded in the form shown in Table 1.

TABLE 1

| Service | CE | Working time segment |
|---|---|---|
| 1 | CE1, CE3 | 4:00~24:00 |
| 2 | CE2, CE4 | 0:00~4:00 |

As shown in FIG. 5, the service handover method in an embodiment of the invention includes the steps as described hereinafter.

In Step 501, the VPN manager reads the CE information of each service among the mutually complementing services and the corresponding working time segments, and determines the handover time.

In Step 501, the VPN manager determines the boundary value of the working time segment as the handover time according to the working time segment in the service time distribution database. For example, the handover time is determined as 0:00 and 4:00 according to the working time segment in Table 1.

In steps 502~503, the VPN manager judges whether the handover time arrives; and, if so, determines the CE that will work in the next working time segment as the current CE, and notifies the optical switch corresponding to the CE which finishes working and the optical switch corresponding to the current CE to hand over; if not, the procedure returns to Step 502.

For example, as shown in Table 1, CE2 needs to interwork with CE4 in the time segment from 0:00 to 4:00. At the handover time 0:00, CE2 and CE4 are the current CEs; and the optical switches corresponding to the current CEs are optical switches 1 and 2. Therefore, the VPN manager notifies optical switch 1 to disconnect CE1 from PE1 and connect CE2 with PE1, and notifies optical switch 2 to disconnect CE3 from PE2 and connect CE4 with PE2. Moreover, at the handover time 4:00, CE1 and CE3 are the current CEs; and the optical switches corresponding to the current CEs are optical switches 1 and 2. Therefore, VPN manager notifies optical switch 1 to disconnect CE2 from PE1 and connect CE1 with PE1, and notifies optical switch 2 to disconnect CE4 from PE2 and connect CE3 with PE2.

In Step 504, the optical switch corresponding to the CE that finishes working disconnects the CE, and the optical switch corresponding to the current CE disconnects the current CE from the PE corresponding to the CE.

In Step 504, optical switches 1 and 2 execute handover, according to the notification of the VPN manager. After 0:00, PE1 exchanges information with CE2, and PE2 exchanges information with CE4, so that CE2 interworks with CE4; after 4:00, PE1 exchanges information with the CE1, and PE2 exchanges information with CE3, so that CE1 interworks with CE3.

By now, the OVPN service handover process in this embodiment is finished.

The previous process shows that, at the handover time, the VPN manager controls the optical switch to disconnect the CE that finishes working, and connect the CE that needs to communicate in the next working time segment with the corresponding PE. Therefore, it is not necessary to configure a port for each CE at the PE side, thus reducing the ports connected with the CE on the PE and decreasing the networking cost of the OVPN. Moreover, if the services of different CEs do not change in the network of the operator in the working time segment after handover compared with those in the working time segment before handover, the optical switch will execute the service handover operation, and the operator does not need to adjust the network route due to service handover. This prevents service intermittency caused by reconfiguration of the cross-connection in the route adjustment process, and improves the network QoS.

Embodiment 2 according to the present invention is elaborated below.

Figure 6:
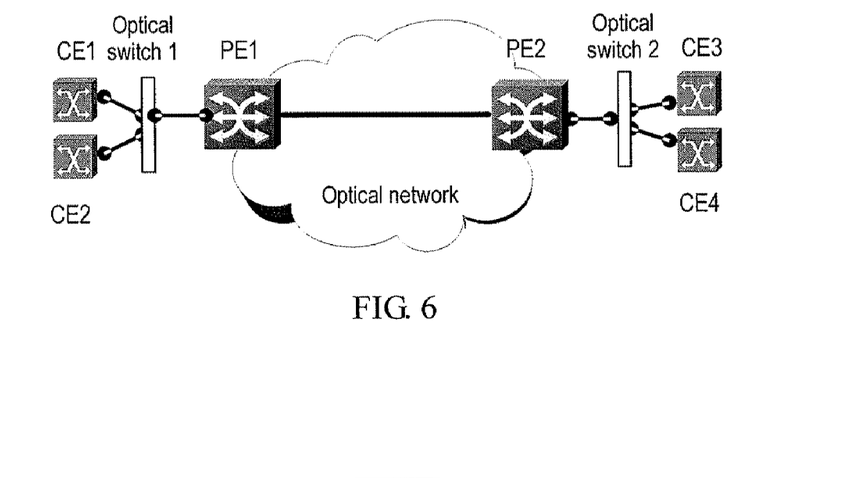
FIG. 6 shows the structure of an OVPN system, according to a second embodiment of the present invention.

FIG. 6 shows a structure of an OVPN system in this embodiment, supposing that the OVPN system includes two optical switches. As shown in FIG. 6, in an OVPN system in this embodiment, the PE stores the CE information of each service among the mutually complementing services that use this PE, and the corresponding working time segments, determines the boundary value of the working time segment as the handover time of the PE, according to the working time segment stored in the PE. At the handover time, the PE corresponding to the handover time notifies the optical switch connected with the PE to disconnect the CE that finishes working, and/or notifies the optical switch to connect the CE that needs to communicate in the next working time segment with the corresponding PE.

Figure 7:
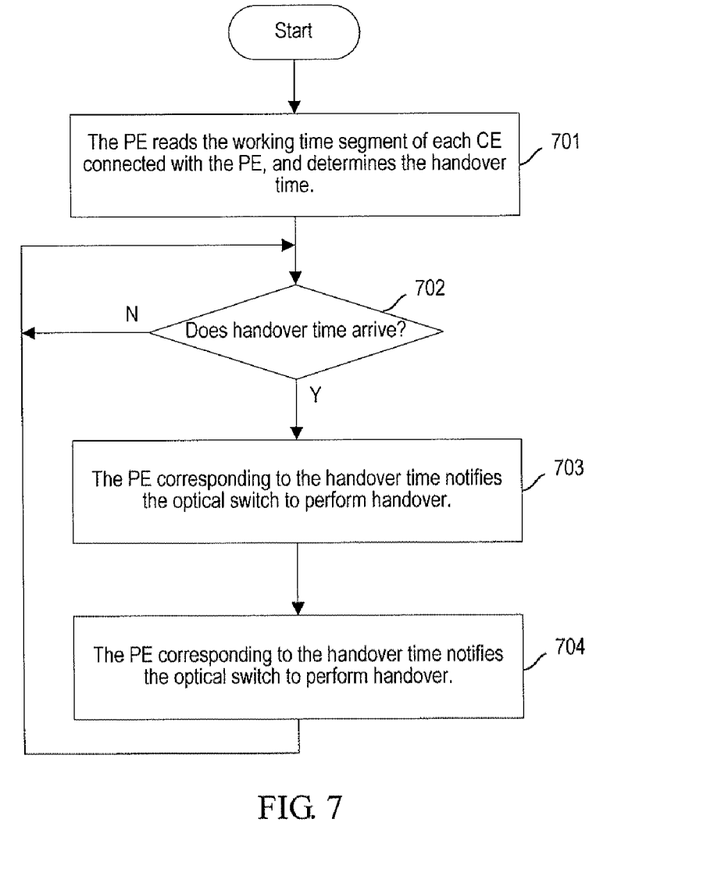
FIG. 7 is a flowchart of the service handover method in an OVPN, according to the second embodiment of the present invention.

FIG. 7 is a flowchart of the service handover method in an OVPN, according to an embodiment of the present invention. Supposing that the CE and the working time segment involved in each service in this embodiment are the same as those in the first embodiment, PE1 stores the working time segments corresponding to CE1 and CE3; and PE2 stores the working time segments corresponding to CE2 and CE4. As shown in FIG. 7, the OVPN service handover method in this embodiment includes the steps as described hereinafter.

In Step 701, the PE reads the working time segment of each CE connected with the PE, and determines the handover time.

In Step 701, the PE1 in FIG. 6 reads the working time segment of CE1 to be 4:00~24:00, reads the working time segment of CE2 to be 0:00~4:00, and determines 4:00 and 24:00 as the handover time. The PE2 reads the working time segment of CE3 to be 4:00~24:00, reads the working time segment of CE4 to be 0:00~4:00, and determines 4:00 and 24:00 as the handover time.

In Steps 702~703, the PE judges whether the handover time arrives: if so, the PE corresponding to the handover time will notify the optical switch to hand over; if not, the procedure returns to Step 702.

In this embodiment, if the CE connected with a PE stops working at the handover time or starts working after the handover time, this PE is the PE corresponding to the handover time.

At 0:00, PE1 notifies the optical switch 1 through signaling to disconnect CE1 from optical switch 1 and connect CE2; at the same time, PE2 notifies optical switch 2 to disconnect CE3 from optical switch 2 and connect CE4.

In Step 704, the optical switch performs handover according to the notification of the PE.

In Step 704, when the CE that finishes working is connected with the PE, the optical switch disconnects the CE that finishes working; when the CE that will work in the next working time segment is connected with the PE, the optical switch connects the CE that will work in the next time segment with the corresponding PE. For example, at 0:00, after receiving a notification from PE1, the optical switch 1 disconnects CE1, and exchanges information with CE2 in order to connect CE2. Meanwhile, after receiving the notification, optical switch 2 disconnects CE3, and exchanges information with CE4 in order to connect CE4.

By now, the OVPN service handover process in this embodiment is finished.

As can be seen from the previous process that, at the handover time, the PE corresponding to the handover time notifies the optical switch to disconnect the CE that finishes working, and/or connect the CE that needs to communicate in the next working time segment. Therefore, it is not necessary to configure a port for each CE at the PE side, thus reducing the ports connected with the CE on the PE and decreasing the networking cost of the OVPN. Moreover, if the services of different CEs do not change in the network of the operator in the working time segment after handover compared with those in the working time segment before handover, the optical switch will execute the service handover operation, and the operator does not need to adjust the network route due to service handover. This prevents service intermittency caused by reconfiguration of the cross-connection in the route adjustment process, and improves the network QoS.

Embodiment 3 according to the present invention is elaborated below.

Figure 8:
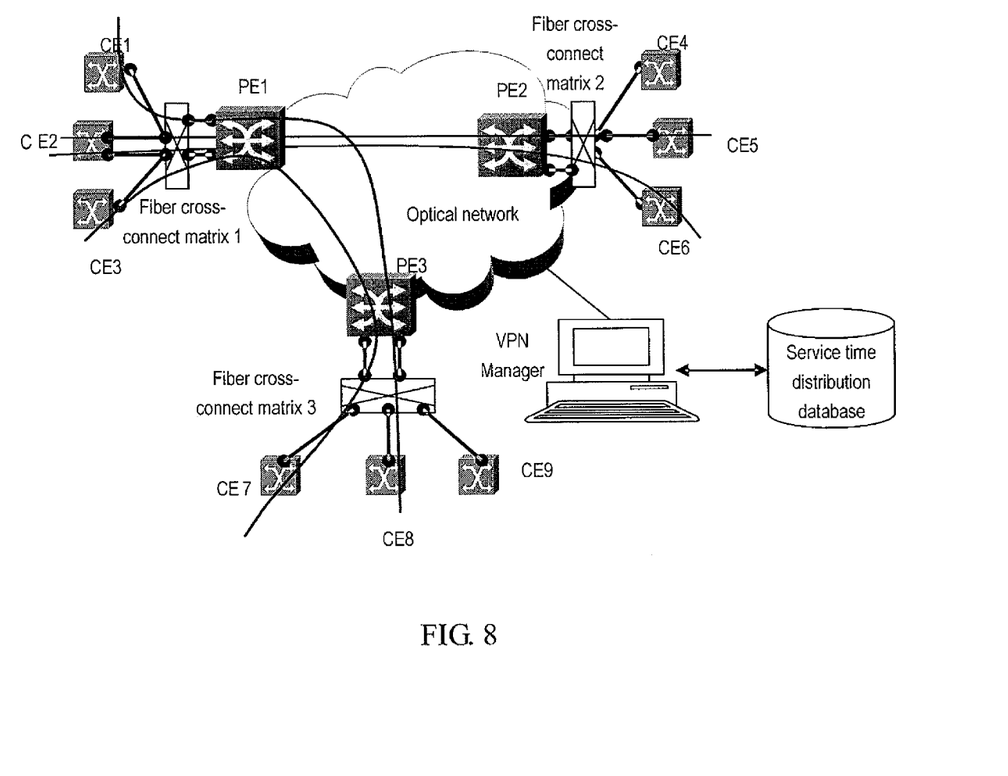
FIG. 8 shows the structure of an OVPN system, according to a third embodiment of the present invention.

FIG. 8 shows a structure of an OVPN system in this embodiment, supposing that the OVPN system includes three fiber cross-connect matrixes. As shown in FIG. 8, like in the first embodiment, the OVPN system provided by the present invention contains a VPN manager and a service time distribution database in addition to a PE and fiber cross-connect matrixes that serve as handover equipment, wherein:

the service time distribution database is adapted to save the CE information in the mutually complementing service and the corresponding working time segment; and the VPN manager is adapted to read data from the service time distribution database, determine the handover time according to the read data, notify the fiber cross-connect matrix corresponding to the CE that finishes working to disconnect the CE upon arrival of the handover time, and/or notify the information on the CE that needs to be connected in the next working time segment to the fiber cross-connect matrix corresponding to the CE, so that the fiber cross-connect matrix will connect the CE with the PE.

The service time distribution database in this embodiment may be independent of the VPN manager, or located inside the VPN manager.

In the example shown in FIG. 8, CE1~CE3 are connected to PE1, CE4~CE6 are connected to PE2, and CE7~CE9 are connected to PE3. In the time segment T1 such as 4:00~24:00, CE1 interworks with CE8, CE3 interworks with CE7; in the time segment T2 such as 0:00~4:00, CE2 interworks with CE5 and CE6. In this way, two ports can be provided between PE1 and the fiber cross-connect matrix of PE1, between PE2 and the fiber cross-connect matrix of PE2, between PE3 and the fiber cross-connect matrix of PE3. Moreover, mutually complementing services are formed between CE1 and CE8, between CE3 and CE7, between CE2 and CE5, between CE2 and CE6.

Figure 9:
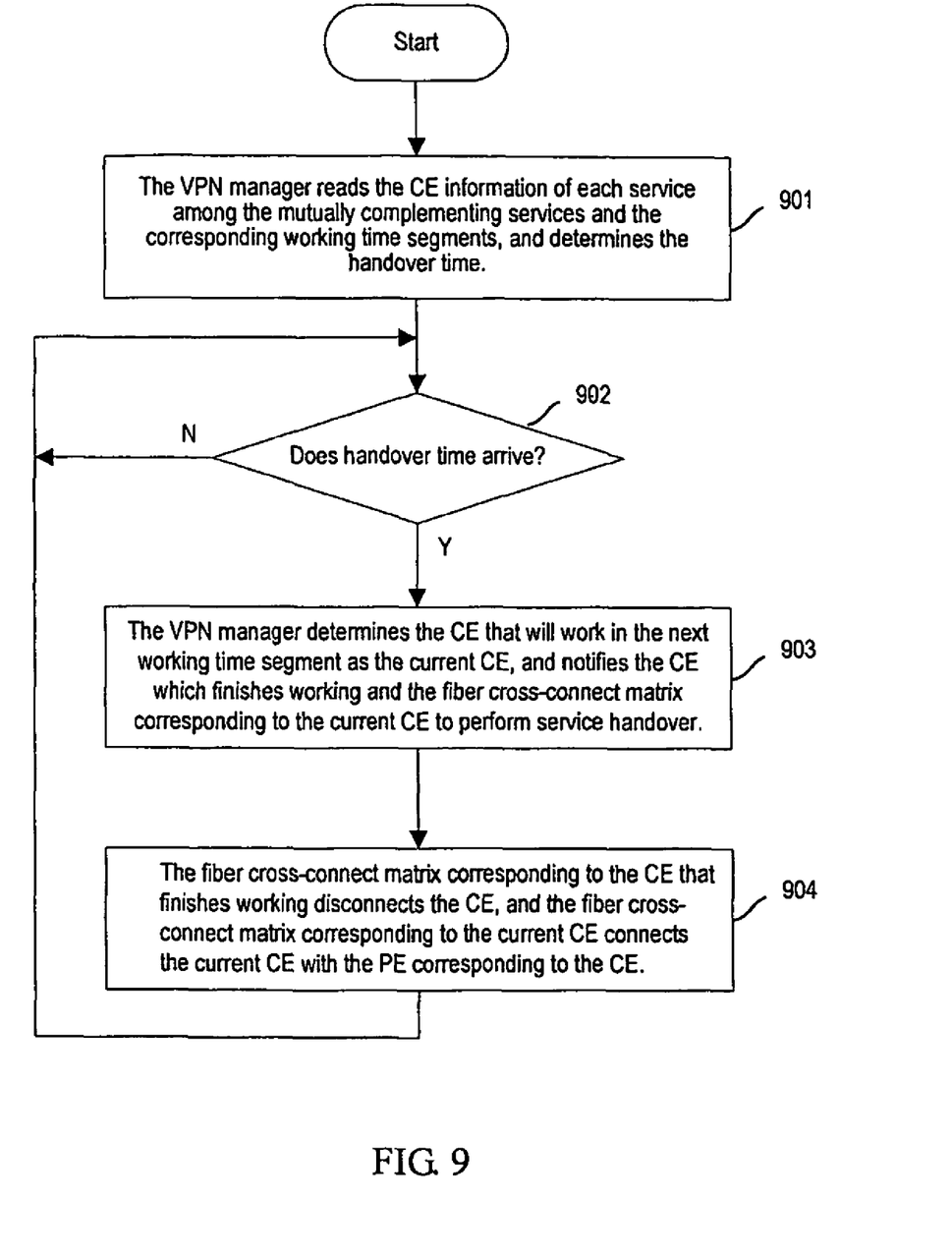
FIG. 9 is a flowchart of the service handover method in an OVPN, according to the third embodiment of the present invention.

FIG. 9 is a flowchart of the service handover method in an OVPN according to an embodiment of the present invention. This embodiment pre-stores the CE information of the mutually complementing services and the corresponding working time segment in the service time distribution database. For example, the CE information of each service and the corresponding working time segments can be recorded in the form shown in Table 2.

TABLE 2

| Service | CE | Working time segment |
| --- | --- | --- |
| 1 | CE1, CE8 | 4:00~24:00 |
| 2 | CE3, CE7 | 4:00~24:00 |
| 3 | CE2, CE5 | 0:00~4:00 |
| 4 | CE2, CE6 | 0:00~4:00 |

As shown in FIG. 9, the service handover method in an embodiment of the present invention includes the steps as described hereinafter.

In Step 901, the VPN manager reads the CE information of each service among the mutually complementing services and the corresponding working time segments, and determines the handover time.

In Step 901, the VPN manager determines the boundary value of the working time segment as the handover time, according to the working time segment in the service time distribution database. For example, the handover time is determined as 0:00 and 4:00 according to the working time segment in Table 2.

In steps 902~903, the VPN manager judges whether the handover time arrives; and, if so, determines the CE that will work in the next working time segment as the current CE, and notifies the fiber cross-connect matrix corresponding to the CE that finishes working and the fiber cross-connect matrix corresponding to the current CE to hand over; if not, the procedure returns to step 902.

For the example shown in Table 2, interworking needs to be performed between CE2 and CE5, between CE2 and CE6 from 0:00 to 4:00. At the handover time 0:00, CE2, CE5 and CE6 are the current CEs; and the fiber cross-connect matrixes corresponding to the current CEs are fiber cross-connect matrixes 1 and 2. Therefore, the VPN manager notifies fiber cross-connect matrix 1 to disconnect CE1 and CE3 from PE1 and connect CE2 with PE1, notifies fiber cross-connect matrix 2 to connect CE5 with PE2 and connect CE6 with PE2, and notifies fiber cross-connect matrix 3 to disconnect CE7 and CE8. Moreover, at the handover time 4:00, CE1, CE3, CE7 and CE8 are the current CEs; and the optical switches corresponding to the current CEs are fiber cross-connect matrixes 1 and 3. Therefore, VPN manager notifies fiber cross-connect matrix 1 to connect CE1 with PE1, to connect CE3 with PE1, and to disconnect CE2, notifies fiber cross-connect matrix 2 to disconnect CE5 and CE6, and notifies fiber cross-connect matrix 3 to connect CE7 with PE3, and connect CE8 with PE3.

In Step 904, the fiber cross-connect matrix corresponding to the CE that finishes working disconnects the CE, and the fiber cross-connect matrix corresponding to the current CE connects the current CE with the PE corresponding to the CE.

In Step 904, fiber cross-connect matrixes 1, 2 and 3 execute service handover according to the notification of the VPN manager. After 0:00, PE1 exchanges information with CE2, and PE2 exchanges information with CE5 and CE6, so that CE2 interworks with CE5 and CE6; after 4:00, PE1 exchanges information with CE1 and CE3, and PE3 exchanges information with CE7 and CE8, so that CE1 interworks with CE8, and CE3 interworks with CE7.

By now, the OVPN service handover process in this embodiment is finished.

As can be seen from the previous process that, at the handover time, the VPN manager controls the fiber cross-connect matrix to disconnect the CE that finishes working, and/or connect the CE that needs to communicate in the next working time segment with the corresponding PE. Therefore, it is not necessary to configure a port for each CE at the PE side, thus reducing the ports connected with the CE on the PE and decreasing the networking cost of the OVPN.

Embodiment 4 according to the present invention is elaborated below.

Figure 10:
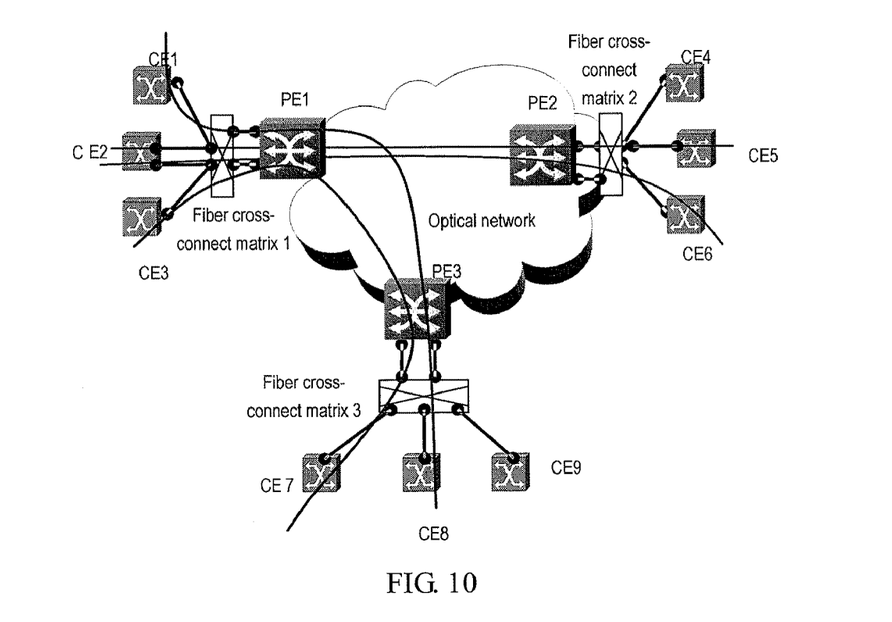
FIG. 10 shows the structure of an OVPN system, according to a fourth embodiment of the present invention.

FIG. 10 shows a structure of an OVPN system in this embodiment, supposing that the OVPN system includes three fiber cross-connect matrixes. As shown in FIG. 10, in an OVPN system in this embodiment, the PE stores the CE information of each service among the mutually complementing services that use this PE, and the corresponding working time segments, and determines the boundary value of the working time segment as the handover time of the PE, according to the working time segment stored in the PE. At the handover time, the PE corresponding to the handover time notifies the corresponding fiber cross-connect matrix to disconnect the CE that finishes working, and notifies the fiber cross-connect matrix to connect the CE with the corresponding PE when the PE is connected with the CE that needs to communicate in the next working time segment.

Figure 11:
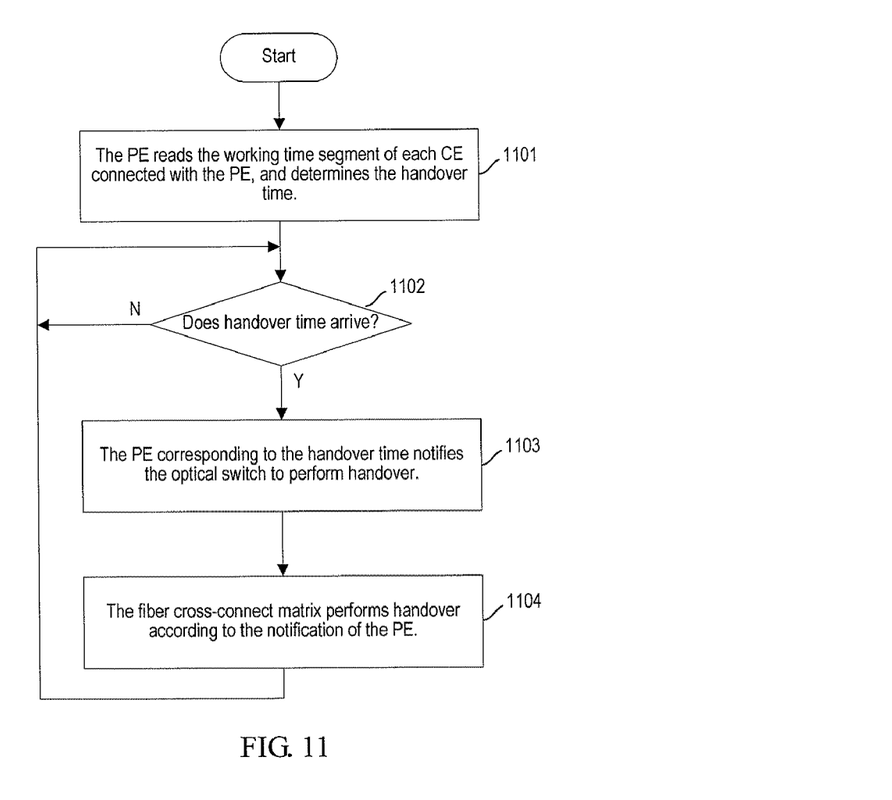
FIG. 11 is a flowchart of the service handover method in an OVPN, according to the fourth embodiment of the present invention.

FIG. 11 is a flowchart of the service handover method in an OVPN, according to this embodiment. Supposing that the CE and the working time segment involved in each service in this embodiment are the same as those in the third embodiment, PE1 stores the working time segments corresponding to CE1, CE2 and CE3; PE2 stores the working time segments corresponding to CE5 and CE6; and PE3 stores the working time segments of CE8 and CE9. As shown in FIG. 11, the OVPN service handover method in this embodiment includes the steps as described hereinafter.

In Step 1101, the PE reads the working time segment of each CE connected with the PE, and determines the handover time.

In Step 1101, the PE1 in FIG. 10 reads the working time segment of CE1 and CE3 to be 4:00~24:00, reads the working time segment of CE2 to be 0:00~4:00, and determines 4:00 and 24:00 as the handover time; PE2 reads the working time segment of CE5 and CE6 to be 0:00~4:00, and determines 4:00 as the handover time; PE3 reads the working time segments of CE7 and CE8 to be 4:00~24:00, and determines 24:00 as the handover time.

In steps 1102~1103, the PE judges whether the handover time arrives: if so, the PE corresponding to the handover time will notify the fiber cross-connect matrix to perform service handover; if not, the procedure returns to step 1102.

At 0:00, PE1 notifies the fiber cross-connect matrix 1 through signaling to disconnect CE1 and CE3 from optical switch 1 and connect CE2; PE2 notifies fiber cross-connect matrix 2 to connect CE5 with CE6; meanwhile, the service does not involve the CE connected with PE3 in the next working time segment, so PE3 notifies optical switch 3 to disconnect CE7 and CE8 from the fiber cross-connect matrix.

At 4:00, PE1 notifies the fiber cross-connect matrix 1 through signaling to disconnect CE2 from fiber cross-connect matrix 1 and connect CE1 and CE3; PE2 notifies fiber cross-connect matrix 2 to disconnect CE5 and CE6; meanwhile, PE3 notifies fiber cross-connect matrix 3 to connect CE7 and CE8 with PE3.

In Step 1104, the fiber cross-connect matrix performs handover, according to the notification of the PE.

In Step 1104, when the PE is connected with the CE that will work in the working time segment before the handover time, the fiber cross-connect matrix disconnects the CE that should stop working; when the PE is connected with the CE that will work in the working time segment after the handover time, the fiber cross-connect matrix connects the CE that should begin working. For example, at 0:00, after receiving a notification from PE1, fiber cross-connect matrix 1 disconnects CE1 and CE3, and exchanges information with CE2 in order to connect CE2; after receiving the notification from PE2, fiber cross-connect matrix 2 connects CE5 and CE6; after receiving the notification from PE3, fiber cross-connect matrix 3 disconnects CE7 and CE8.

By now, the OVPN service handover process in this embodiment is finished.

The previous process shows that, at the handover time, the PE corresponding to the handover time notifies the fiber cross-connect matrix to disconnect the CE that finishes working, and/or connect the CE that needs to communicate in the next working time segment. Therefore, it is not necessary to configure a port for each CE at the PE side, thus reducing the ports connected with the CE on the PE and decreasing the networking cost of the OVPN.

Although the invention has been described through some exemplary embodiments, the present invention is not limited to such embodiments. It is apparent that those skilled in the art can make various modifications and variations to the invention without departing from the spirit and scope of the present invention. The invention is intended to cover the modifications and variations provided that they fall in the scope of protection defined by the following claims or their equivalents.

What is claimed is:

1. An optical network system, comprising:
   a Provider Edge (PE), adapted to provide optical network access for a Customer Edge (CE) wherein the CE and the PE are used for mutually complementing services;
   a service time distribution database, adapted to store CE information in the mutually complementing services and working time segments corresponding to the CE information;
   a handover equipment between the PE and the CE, adapted to process at least one task of the following tasks: (1) disconnecting the CE when it finishes working at a handover time and (2) connecting the PE with the CE for working in a time segment following the handover time; and
   a Virtual Private Network (VPN) manager, adapted to read the CE information in the mutually complementing services and the working time segments from the service time distribution database, determine the handover time, notify the handover equipment to perform handover at the handover time.

2. The system of claim 1, wherein the service time distribution database is located in the VPN manager.

3. An optical network system, comprising:
   a Provider Edge (PE), adapted to provide optical network access for a Customer Edge (CE) the PE stores CE information of each service among mutually complementing services that use the PE, and stores working time segments; and
   a handover equipment between the PE and the CE, adapted to process at least one task of the following tasks: (1) disconnecting the CE when it finishes working at a handover time and (2) connecting the PE with the CE for working in a time segment following the handover time;
   wherein the PE is further adapted to determine the handover time of the PE, according to the stored CE information and working time segments, and notify the handover equipment connected with the PE to perform handover at the handover time.

4. A service handover method in an optical network, wherein: a handover equipment is set between a Provider Edge (PE) and a Customer Edge (CE), and CE information in mutually complementing services and working time segments corresponding to the CE information are stored in a service time distribution database; the method comprises:

determining, by a Virtual Private Network (VPN) manager, a handover time according to the stored CE information and working time segments; and     processing, by the handover equipment, at least one task of the following tasks: (1) disconnecting the CE when it finishes working at the handover time and (2) connecting the PE with the CE for working in a time segment following the handover time;

wherein the operation of determining the handover time is:

reading, by the VPN manager, the CE information of each service among the mutually complementing services and the working time segments from the service time distribution database, and determining a boundary value of the working time segments as the handover time.

5. The method of claim 4, further comprising the following steps when the handover time arrives:

determining, by the VPN manager, a CE that will work in the time segment following the handover time as a current CE, and notifying the handover equipment corresponding to another CE which finishes working and the handover equipment corresponding to the current CE to hand over; and     disconnecting, by the handover equipment corresponding to the CE which finishes working, the CE which finishes working; connecting, by the handover equipment corresponding to the current CE, a PE corresponding to the current CE.

6. A service handover method in an optical network, wherein: a handover equipment is set between a Provider Edge (PE) and a Customer Edge (CE), and CE information in mutually complementing services that use the PE and working time segments corresponding to the CE information are stored in the PE; the method comprises:

determining, by the PE, a handover time according to the stored CE information and working time segments; and     processing, by the handover equipment, at least one task of the following tasks: (1) disconnecting the CE when it finishes working at the handover time and (2) connecting the PE with the CE for working in a time segment following the handover time;

wherein the operation of determining the handover time is:

reading, by the PE, the CE information and the working time segments, and determining a boundary value of the working time segments as the handover time.

7. The method of claim 6, further comprising the following step when the handover time arrives:

notifying, by the PE, the handover equipment connected with the PE to perform handover at the handover time.

8. A Provider Edge (PE), wherein: the PE is connected with a handover equipment; the PE is adapted to store Customer Edge (CE) information of each service among mutually complementing services that use the PE and store working time segments corresponding to the CE information, determine a handover time of the PE, according to the stored CE information and working time segments, and send out a notification that indicates the need of handover to the handover equipment at the handover time;

wherein the notification comprises at least one need of the following needs: (1) the handover equipment is disconnected with the CE when it finishes working at the handover time, and (2) the handover equipment is connected the PE with the CE for working in a time segment following the handover time.

* * * * *